United States Patent [19]

Yanabu et al.

[11] 4,306,267

[45] Dec. 15, 1981

[54] ARRESTER

[75] Inventors: Satoru Yanabu, Machida; Susumu Nishiwaki; Toshikazu Satoh, both of Yokohama, all of Japan

[73] Assignee: Tokyo Shibaura Denki Kabushiki Kaisha, Japan

[21] Appl. No.: 74,053

[22] Filed: Sep. 10, 1979

[30] Foreign Application Priority Data

Sep. 9, 1978 [JP] Japan ............................ 53-110984

[51] Int. Cl.$^3$ ............................ H02H 9/04

[52] U.S. Cl. ............................ 361/127; 315/36

[58] Field of Search ............... 361/127, 128, 126, 129, 361/130, 131, 117; 315/36; 313/231.1

[56] References Cited

U.S. PATENT DOCUMENTS

| | | | |
|---|---|---|---|
| 2,608,600 | 8/1952 | Vörts et al. | 361/129 |
| 3,519,878 | 7/1970 | McStrack et al. | 361/128 X |
| 3,896,352 | 7/1975 | Miles | 361/128 |
| 4,174,530 | 11/1979 | Kresge et al. | 361/127 |

FOREIGN PATENT DOCUMENTS 2248113 4/1974 Fed. Rep. of Germany ...... 361/129

OTHER PUBLICATIONS

"Applications of Zinc Oxide to Protect Power Systems and Equipment" by E. C. Sakshaug, Preprints of Papers for Symposium in Joint Conference on Zinc Oxide Varistors-9-26-78, Japan.

*Primary Examiner*—Patrick R. Salce
*Attorney, Agent, or Firm*—Finnegan, Henderson, Farabow, Garrett & Dunner

[57] ABSTRACT

An arrester comprises a plurality of blocks connected in parallel between first and second connecting metal plates and each comprised of a plurality of stacked nonlinear resistor elements, at least one block comprised of a plurality of stacked nonlinear resistor elements and connected between the second connecting metal plate and a third connecting metal plate grounded, and a discharge gap connected in parallel with the later-mentioned block and between the second and third connecting metal plates. The discharge gap is provided below one of the blocks connected in parallel between the first and second connecting metal plates.

5 Claims, 11 Drawing Figures

ARRESTER

This invention relates to an arrester comprising in combination nonlinear resistor elements and a parallel-connected discharge gap.

Conventionally, an arrester free from a series-mode discharge gap has been used which comprises in combination an array of nonlinear resistor elements stacked one upon another and consisting mainly of metal oxide such as zinc oxide, and a discharge gap connected in parallel with some of the nonlinear resistor elements. FIG. 1 is a diagrammatic view showing one arrangement of an arrester by way of example. In FIG. 1, nonlinear resistor elements 1—1, 1-2, 1-3, . . . 1-11, 1-12 and 1-13 having an equal dimension and equal rating are vertically stacked one upon another to provide a column 3. Between an interface between the resistor elements 1-9 and 1-10 on one hand and the lowest resistor element 1-13 on the other, a discharge gap 2 is connected in parallel with a block II comprised of the resistor elements 1-10 to 1-13. Such an arrester has its terminals A and B connected to, for example, a transmission line and ground, respectively. When, for example, a switch is operated and surge voltage is built up in the transmission line, the surge current flows between the terminals A and B. By the surge current a divided voltage is developed across the block II and thus applied across the discharge gap 2. The discharge gap 2 is designed such that it initiates no discharge by surge voltage normally developed in the power transmission system and that it starts a discharge only when large surge voltage occurs due to a thunderbolt. If a voltage across the block II exceeds a discharge starting voltage across the discharge gap connected in parallel with the block II, the discharge gap 2 is discharged, causing the terminal voltage of the block II to become much smaller and thus a voltage applied to the arrester to be impressed almost all to the block I of the array. As a result, the surge current flows through the discharge gap 2 from the block 1 of the array.

In order for large surge current to be flowed in the arrester of FIG. 1 it is necessary to make greater the current capacity of each of the resistor elements 1—1, . . . , 1-9 in the block I of the array. This can be realized by making the size of the respective resistor element greater, but is impractical because a largesized nonlinear resistor element is very high in its manufacturing cost. For this reason, an arrester as shown in FIG. 2 has been proposed in which a column 3 of nonlinear resistor elements which comprises such blocks I and II as shown in FIG. 1 is connected in parallel with another column 4 of nonlinear resistor elements of similar configuration. The column 4 of nonlinear resistor elements comprises a block Ia having resistor elements **1*a*-1, 1*a*-2 . . . 1*a*-9 and block IIa having resistor elements 1*a*-10 . . . 1*a*-12. In this arrangement, the blocks I and Ia of the columns 3 and 4 are connected in parallel with each other by two connecting metal plates 5*a*, 5*b*; and the blocks II and IIa of the respective columns 3 and 4 are connected in parallel with each other by two connecting metal plates 5*b*, 5*c*. One end of each of the connecting metal plates 5*b*, 5*c* extends from the side of the column 4, and between the extensions of the metal plates 5*b*, 5*c* a discharge gap 2** is connected in parallel with the blocks II and IIa.

Since in this arrangement the blocks I, Ia are connected in parallel with the discharge gap 2, the current capacity of the resistor elements with respect to surge current can be made greater than in the arrangement of FIG. 1. In the arrangements of FIGS. 1 and 2 the columns 3, 4 are received in a cylindrical container not shown and the discharge gap 2 is formed in the container. However, a spacing above the discharge gap 2 is not effectively utilized and, moreover, the arrester takes up a much larger floor area for installation due to the presence of the discharge gap. Where a porcelain tube is used as a container for an arrester, the price of the porcelain tube will be raised even if its diameters is slightly increased. For this reason, the arrester as shown in FIGS. 1 and 2 results in a very high cost.

It is accordingly the object of this invention is to provide a small-sized arrester of relatively low cost which has a larger current capacity. According to this invention there is provided an arrester comprising a plurality of blocks each comprised of a plurality of stacked nonlinear resistor elements and connected between first and second connecting metal plates, at least one block comprised of a plurality of nonlinear resistor elements and connected between the second connecting metal plate and a third connecting metal plate grounded, and a discharge gap connected in parallel with the laterdescribed block and between the second and third connecting metal plates and provided below one of the blocks connected between the first and second metal connecting plates.

This invention will be described by way of example by referring to the accompanying drawings in which.

Figure 3A:
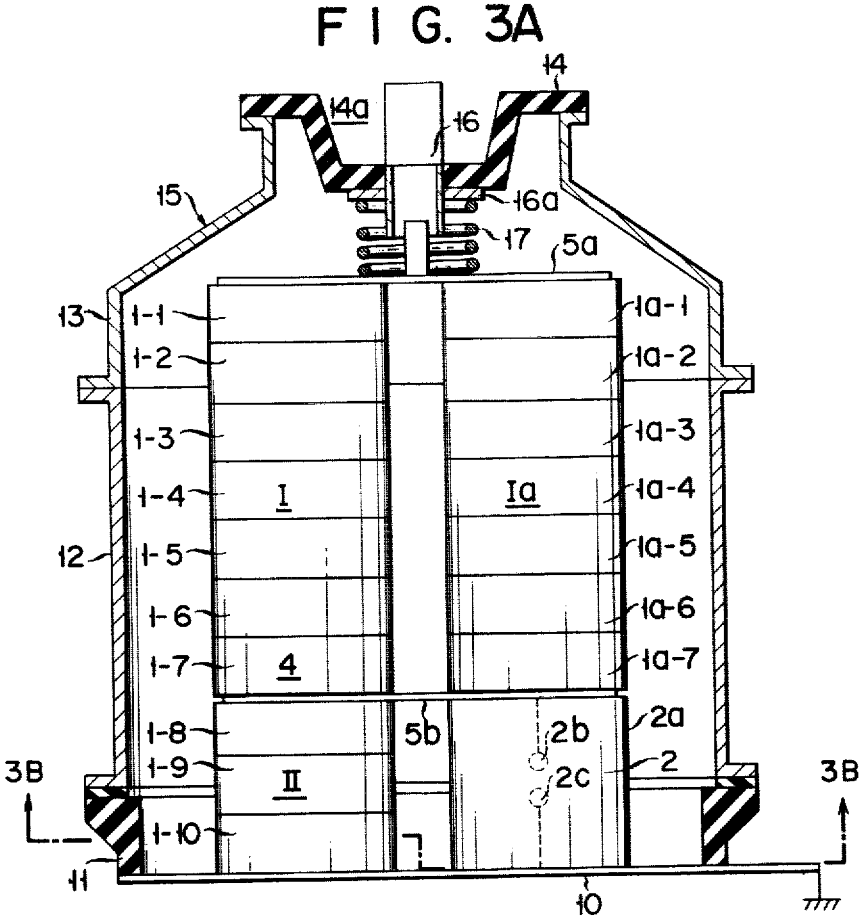
FIG. 3A is a diagrammatic view showing an arrester according to one embodiment of this invention and FIG. 3B is a cross-sectional view as taken along line 3B—3B in FIG. 3A.
Figure 3B:
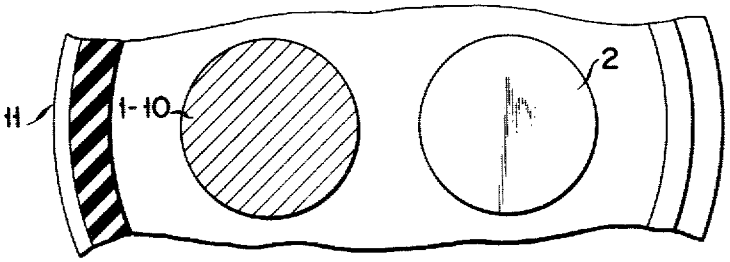

In FIGS. 3A and 3B an annular insulating spacer 11 is intimately contacted with a grounded metal floor 10. A cylindrical metal casing or container 15 comprising an upper cylindrical section 13 and a lower cylindrical section 12 is placed on the insulating spacer 11. An upper opening of the upper cylindrical section 13 is closed by an insulating covering 14. These members 10 to 14 are hermetically sealed such that a high degree of hermetical seal is obtained between these members. It is desirable that the respective members 10 to 14 be made of such material as to provide a high hermetic seal. In this way, a container is constructed which has a high degree of hermetic seal.

A recess **14*a* is provided at the central portion of the insulating covering 14 and a high tension side terminal 16 is provided at the center of the recess 14*a*. The lower end of the terminal 16 extends into the container 15 and a spring 17 made of an electroconductive metal is coiled around the terminal. The upper end of the spring 17 is contacted with a flange portion 16*a* of the terminal 16 and the lower end of the spring 17 is contacted with a connecting metal plate 5*a* by which a block I of nonlinear resistor elements is connected in parallel with a block Ia of nonlinear resistor elements. The spring 17** is inserted between the flange portion 16*a* of the terminal 16 and the connecting metal plate 5*a* and compressed such that the metal plate 5*a* is strongly urged toward the blocks I and Ia.

The block I is constructed of nonlinear resistor elements 1—1, 1-2, . . . 1-7 made of zinc oxide, vertically stacked one upon another between connecting metal plates 5*a*, 5*b* and having an equal dimension. Likewise, the block Ia is constructed of such nonlinear resistor elements 1*a*-1, 1*a*-2 . . . 1*a*-7 which are vertically stacked one upon another between the metal plates 5*a*, 5*b*. The nonlinear resistor elements 1—1 . . . 1-7 and 1*a*-1 . . . 1*a*-7 are substantially equal-rated and hence substantially equal current flows through the blocks I and Ia between the metal plates 5*a*, 5*b*.

A block II is provided under the block I with the metal plate 5*b* in between to provide a column 4. The block II is constructed of nonlinear resistor elements 1-8 . . . 1-10 vertically stacked one upon another between the connecting metal plate 5*b* and the grounded electrode plate 10 and having the same rating as that of the nonlinear resistor elements 1—1 . . . 1-7.

A discharge gap 2 is provided below the block Ia, i.e. between the lower metal plate 5*b* and the grounded electrode plate 10. The discharge gap 2 is provided by oppositely disposing a pair of discharge electrodes 2*b*, 2*c* within an insulating container 2*a*. Such discharge gap is a normally used one and further explanation is therefore omitted for brevity.

The insulating container 2*a* is formed such that it has the same external dimension as that of the block II. The discharge electrodes 2*b*, 2*c* are connected by terminals not shown to the metal plate 5*b* and grounded electrode plate 10, respectively.

The arrester of FIG. 3 is used by connecting its high tension side terminal 16 to, for example, a transmission line. Surge current with respect to a relatively low surge voltage developed by, for example, the opening or closing of a switch flows from the terminal 16 through the metal plate 5*a* into the blocks I and Ia in a parallel mode and then into the grounded electrode 10 through the metal plate 5*b* and block II. At this time, a potential difference is produced between the terminals of the block II i.e. between the plates 5*b* and 10. However, the value of the potential difference does not reach a discharge starting voltage set at the discharge gap with the result that the discharge gap 2 is not discharged. At this time, an amount of surge current flowing from the blocks I, Ia into the block II is relatively small and it is not necessary, therefore, to design a block II of larger current capacity.

If large surge current occurs in the transmission line due to a thunderbolt etc., a relatively large surge current tends to flow from the blocks I, Ia into the block II. When a voltage between the terminals of the block II exceeds a discharge starting voltage, the discharge gap 2 starts to be discharged. As a result, the block II is short-circuited by the discharge gap 2 and thus electric current ceases to flow. The surge current at this time has a relatively large value and equally flows through the blocks I, Ia. Since a current withstand amount of the block II in parallel with the discharge gap 2 may be smaller than that of the blocks I, Ia, only a single block II is sufficient upon comparison with a parallel arrangement of blocks I, Ia. In consequence, the discharge gap 2 can be effectively provided below the block Ia, permitting a compact arrester.

This invention is not restricted to the embodiment of FIG. 3A and embodiments as shown in FIGS. 4A, 4B, 5A, 5B and 6A, 6B and FIG. 7 are also possible according to this invention.

The embodiments of FIGS. 4A, 4B, 5A, 5B, 6A, 6B and 7 will be explained below by attaching the same reference numerals throughout to parts or elements corresponding to those shown in FIG. 3A. For simplicity, a container 15 is omitted in these Figures.

Figure 4A:
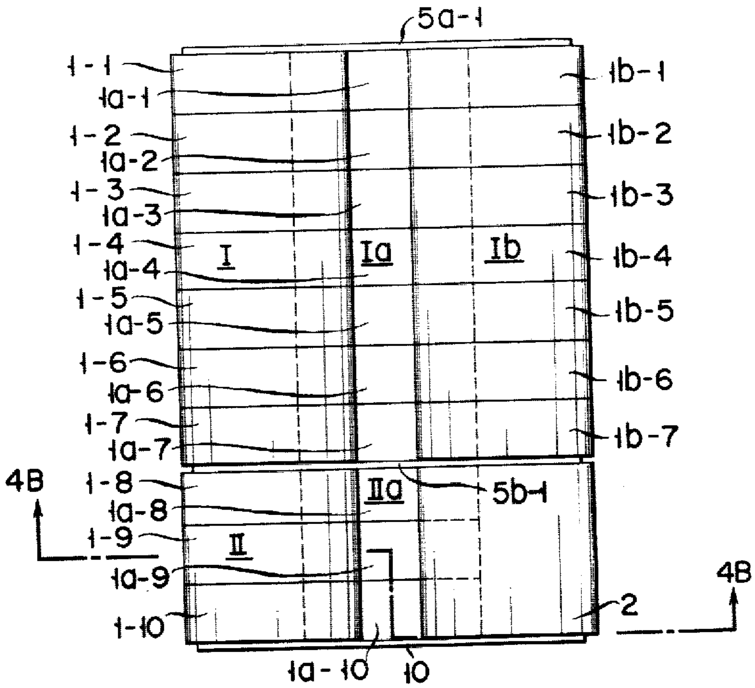
FIGS. 4A, 5A and 6A are diagrammatic views each showing an arrester according to a different embodiment of this invention.
Figure 4B:
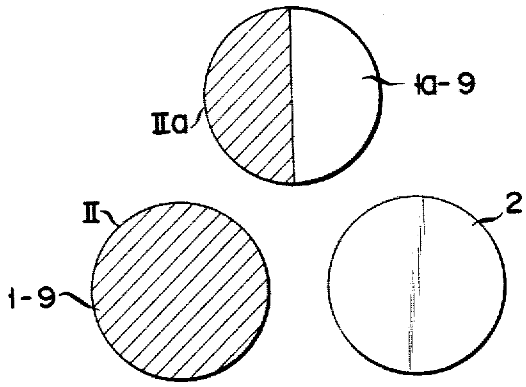
FIGS. 4B, 5B, and 6B are cross-sectional views taken along line 4B—4B in FIG. 4A, 5B—5B in FIG. 5A and 6B—6B in FIG. 6A, respectively.

In FIGS. 4A, 4B, between connecting metal plates 5*a*-1 and 5*b*-1 of triangular configuration three blocks I, Ia and Ib of nonlinear resistor elements are connected in parallel with each other and blocks II, IIa are provided below the blocks I, Ia with the metal plates 5*b*-1 in between to provide respective columns. A discharge gap 2 is provided below the block Ib. The blocks II, IIa and discharge gap 2 are provided such that their respective centers are located respectively at the apices of a regular triangle as shown in FIG. 4B. In this embodiment, a relatively small surge current flows through the blocks I, Ia and Ib in parallel mode and then flows through the blocks II, IIa in parallel mode. A large surge current flows through the blocks I, Ia and Ib in parallel mode and then flows through the discharge gap 2.

Figure 5A:
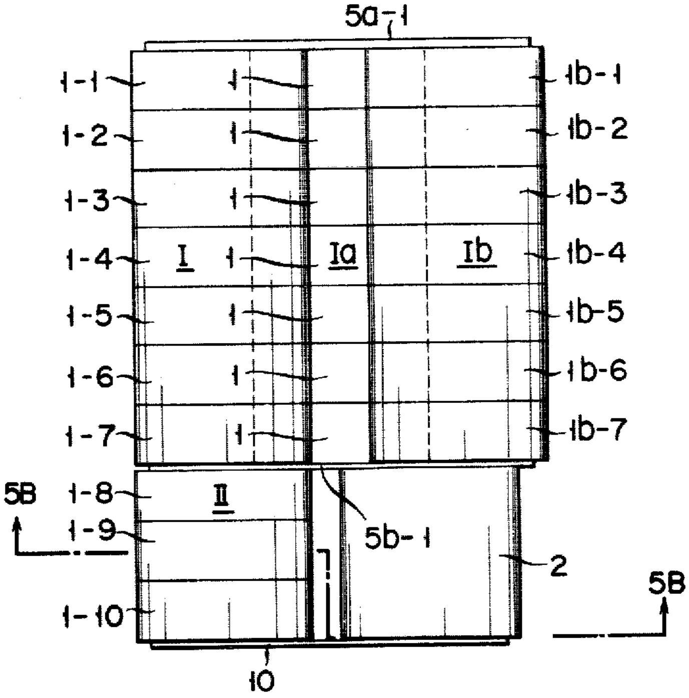
Figure 5B:
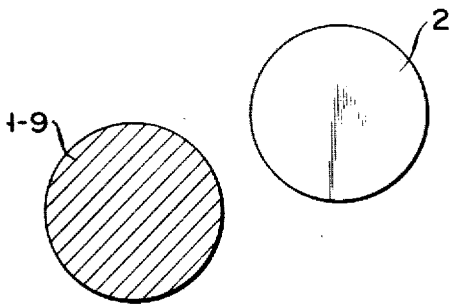

The embodiment of FIG. 5A, 5B is substantially the same as the embodiment of FIG. 4A, 4B except that a block IIa is omitted and that a discharge gap 2 is connected in parallel with a block II. In this embodiment only the block II is connected to a parallel arrangement of the blocks I, Ia and Ib and, during the operation of the discharge gap 2, surge current flows from the parallel arrangement of the blocks I, Ia and Ib into the discharge gap 2, thus short-circuiting the block II.

Figure 6A:
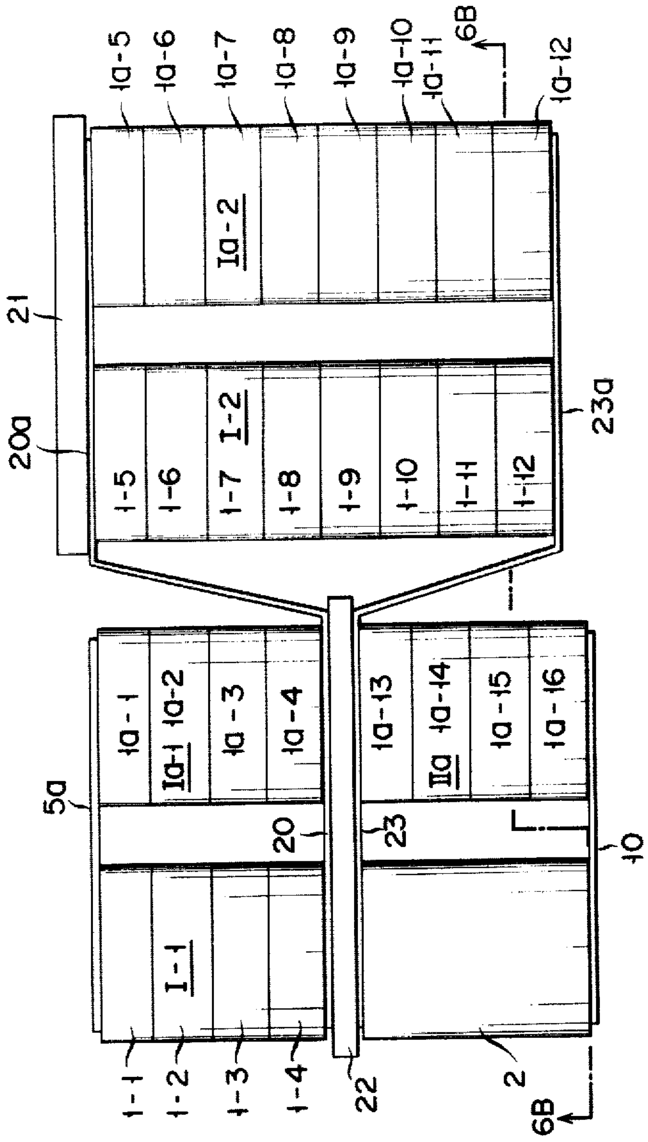
Figure 6B:
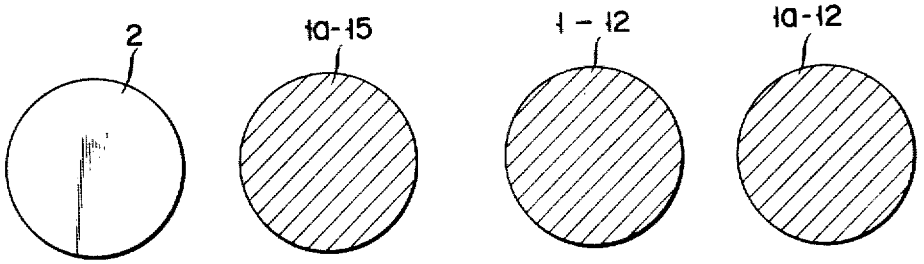

The embodiment of FIGS. 6A, 6B is such that in order to lower the height of an arrester as a whole two connecting metal plates 20, 23 have extensions outwardly bent as shown in FIG. 6A such that intermediate blocks I-2 and Ia-2 are received between the extensions of the metal plates. In this arrangement, a block I-1 corresponds to the block I-2 and a block Ia-1 to the block Ia-2. The blocks I-1 and Ia-1 are arranged, in parallel connection, under a high tension side connecting metal plate 5*a* and comprise nonlinear resistor elements 1—1, 1-2, 1-3 and 1-4 and 1*a*-1, 1*a*-2, 1*a*-3 and 1*a*-4, respectively. The lower ends of the blocks I-1, Ia-1 are connected to each other by the metal plate 20. An insulating plate 21 is disposed on that upper section 20*a* of the extension of the connecting metal plate 20 under which the blocks I-2 and Ia-2 comprising nonlinear resistor elements 1-5 . . . 1-12 and 1*a*-5 . . . 1*a*-12, respectively, are arranged in parallel connection. The lower ends of the blocks I-2, Ia-2 are connected in parallel with each other by a lower section 23*a* of the extension of the metal plate 23. An insulating plate 22 is sandwiched by the unbent sections of the metal plates 20 and 23. Under the unbent section of the metal plate 23 a block IIa comprising nonlinear resistor elements 1*a*-13 . . . 1*a*-16 and a discharge gap 2 are provided in parallel connection such that they are located between the metal plate 23 and a grounded electrode plate 10. The lower section of the metal plate 23*a* is supported by a proper insulating member within a container of the arrester.

Between the unbent sections of the metal plates 20 and 23 the blocks I-1 and Ia-1 are connected in parallel with each other, between the sections 20*a* and 23*a* of the metal plates 20 and 23 the blocks I-2 and Ia-2 are connected in parallel with each other, and the block IIa and the discharge gap 2 are connected in parallel between the metal plate 23 and the grounded electrode plate 10. Thus, the embodiment of FIGS. 6A, 6B effects the same operation as that of FIGS. 3A, 3B.

Figure 7:
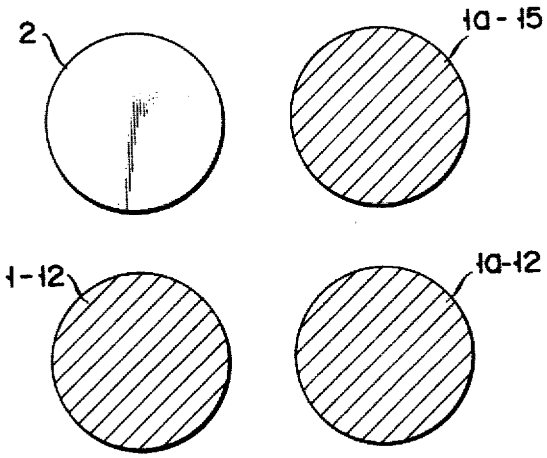
FIG. 7 is a cross-sectional view showing an arrester showing another embodiment of this invention.

Although the discharge gap 2 and blocks IIa, I-2 and Ia-2 are provided in a straight line as shown in FIG. 6B, an arrangement as shown in FIG. 7 may be adopted in which the apices of the discharge gap 2 and blocks IIa, I-2 and Ia-2 are located on the line of a circle. In this embodiment, the cross-section of the container can be made small compared with the embodiment of FIGS. 6A, 6B.

Figure 1:
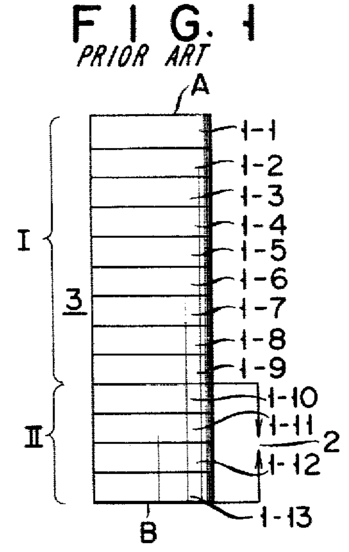
FIG. 1 PRIOR ART
FIGS. 1 and 2 are diagrammatic views showing an arrangement of a conventional arrester.
Figure 2:
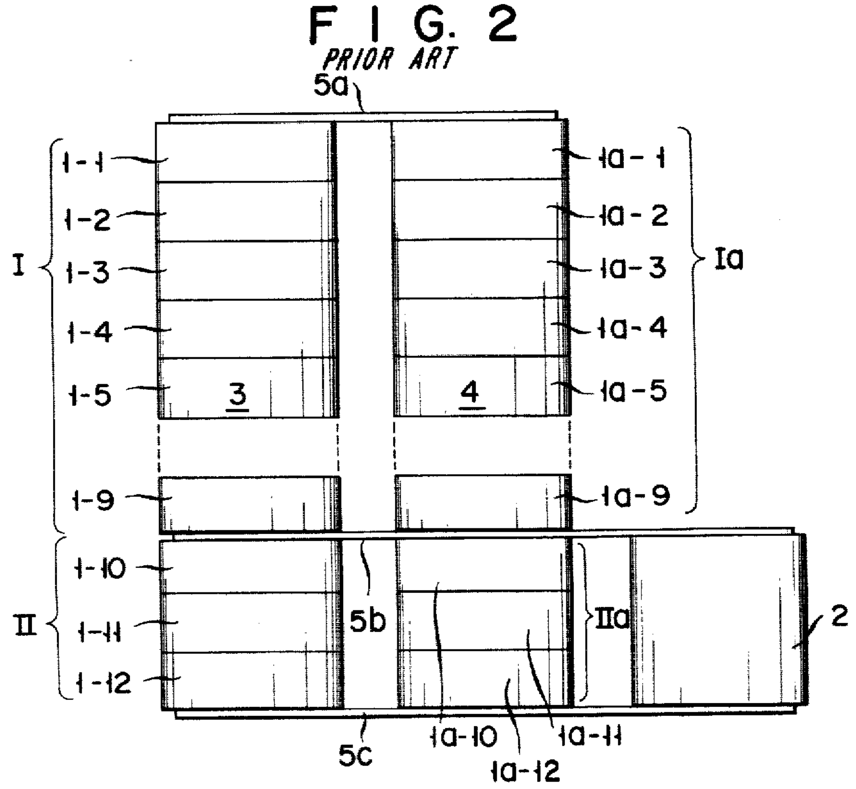
FIG. 2 PRIOR ART

As will be understood from the above, this invention utilizes the fact that the block connected in parallel with the discharge gap can be made smaller in number than the blocks connected in parallel at the high tension side terminal. According to this invention a discharge gap is provided below one of the blocks at the high tension side terminal, thus making the arrester compact in size and lower in cost. In the embodiment of FIG. 2 the metal container is used. Where a porcelain tube is used in place of the metal container, a smaller porcelain tube can be used, serving to reduce the cost of the arrester.

What we claimed is:

1. A compact arrester comprising:

a first group of at least two resistor blocks which are connected in parallel and compactly disposed adjacent to each other between first and second connecting metal plates, each block being comprised of a plurality of stacked nonlinear resistor elements, wherein the first connecting plate connects the upper ends of the individual resistor blocks, and wherein the second connecting plate connects the lower ends of said resistor blocks with each other;

a second group including at least one further resistor block which is compactly disposed beneath a resistor block of the first group between said second connecting plate and a grounded metal plate, said further resistor block being comprised of stacked nonlinear resistor elements and being connected at its upper end to said second connecting plate and at its lower end to said grounded metal plate;

a discharge gap compactly disposed adjacent to said further resistor block of the second group between said second connecting plate and said grounded metal plate and being connected in parallel with said further resistor block, and disposed directly beneath one of the resistor blocks of the first group; and a compact container receiving the resistor blocks of said first group and said second group, the connecting plates and the discharge gap, characterized in that the number of resistor blocks of the first group is larger than the number of resistor blocks of the second group.

2. An arrester according to claim 1 in which said blocks in said first group are two in number, and the block in said second group is one in number and connected between said second connecting metal plate and said grounded metal plate.

3. An arrester according to claim 1 in which the blocks in said first group are three in number and the block in said second group is two in number.

4. An arrester according to claim 1 in which the blocks in said first group are three in number and the block in said second group is one in number.

5. An arrester according to claim 1 in which said second connecting metal plate has an outwardly bent extension, an insulating plate is disposed on the undersurface of said second connecting metal plate, a third connecting metal plate is disposed on the undersurface of said insulating plate and has an outwardly bent extension so that intermediate blocks comprised of nonlinear resistor elements and corresponding in number to the blocks in said first group are received, in parallel connection, between the extensions of said second and third connecting metal plates, and the block in the second group and the discharge gap are provided between the third connecting metal plate and the grounded metal plate.

* * * * *